United States Patent
Schouten

(10) Patent No.: US 8,955,189 B2
(45) Date of Patent: Feb. 17, 2015

(54) MULTI-PURPOSE CLEANING TOOL

(71) Applicant: Hopkins Manufacturing Corporation, Emporia, KS (US)

(72) Inventor: Pieter Schouten, Berkeley, CA (US)

(73) Assignee: Hopkins Manufacturing Corporation, Emporia, KS (US)

( * ) Notice: Subject to any disclaimer, the term of this patent is extended or adjusted under 35 U.S.C. 154(b) by 71 days.

(21) Appl. No.: 13/663,121

(22) Filed: Oct. 29, 2012

(65) Prior Publication Data

US 2013/0104329 A1    May 2, 2013

Related U.S. Application Data

(60) Provisional application No. 61/552,711, filed on Oct. 28, 2011.

(51) Int. Cl.
| | |
|---|---|
| *A47L 13/11* | (2006.01) |
| *A47L 13/12* | (2006.01) |
| *B08B 1/00* | (2006.01) |
| *B60S 3/04* | (2006.01) |

(52) U.S. Cl.
CPC . *B08B 1/00* (2013.01); *B08B 1/006* (2013.01); *B60S 3/045* (2013.01)
USPC ............................................. 15/121; 15/118

(58) Field of Classification Search
CPC ................................ A47L 13/11; A47L 13/12
USPC ............................................ 15/118, 121, 227
See application file for complete search history.

(56) References Cited

U.S. PATENT DOCUMENTS

| | | | | |
|---|---|---|---|---|
| 1,820,847 | A * | 8/1931 | Sullivan | 2/162 |
| 2,210,754 | A * | 8/1940 | Frank | 401/7 |
| 5,448,793 | A * | 9/1995 | Mallory et al. | 15/232 |
| 6,216,305 | B1 * | 4/2001 | Joh | 15/104.92 |

FOREIGN PATENT DOCUMENTS

| | | |
|---|---|---|
| JP | 61092349 | 6/1986 |
| KR | 2019930006208 | 4/1993 |
| KR | 200229728 | 7/2001 |
| KR | 100775597 | 11/2007 |

OTHER PUBLICATIONS

International Search Report Form PCT/ISA/220, International Application No. PCT/US2012/062422/pp. 1-9, (2013).

* cited by examiner

*Primary Examiner* — Randall Chin
(74) *Attorney, Agent, or Firm* — George R. McGuire; Bond Schoeneck & King, PLLC

(57) ABSTRACT

A hand-held, multi-purpose cleaning tool the includes an elongated body member, a squeegee interconnected to the body member along one edge thereof, and a microfiber cloth assembly that is interconnected to the body member along an opposite edge thereof. The microfiber cloth assembly includes a microfiber bonnet that is open along one edge thereof and a rigid, elongated rod that is positioned within the microfiber bonnet. The squeegee securely interconnects with the body member along an edge opposite the microfiber bonnet assembly and includes an elongated blade that has a slit formed at about its midpoint to permit flexing and contouring of the blade to an uneven surface.

11 Claims, 2 Drawing Sheets

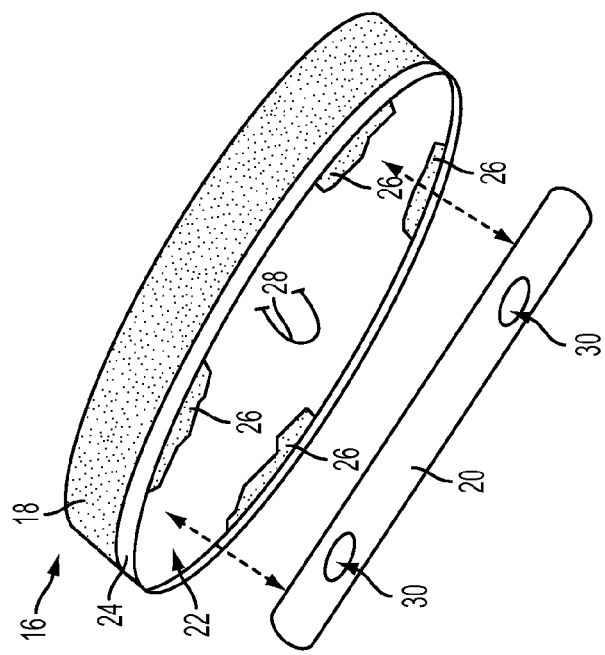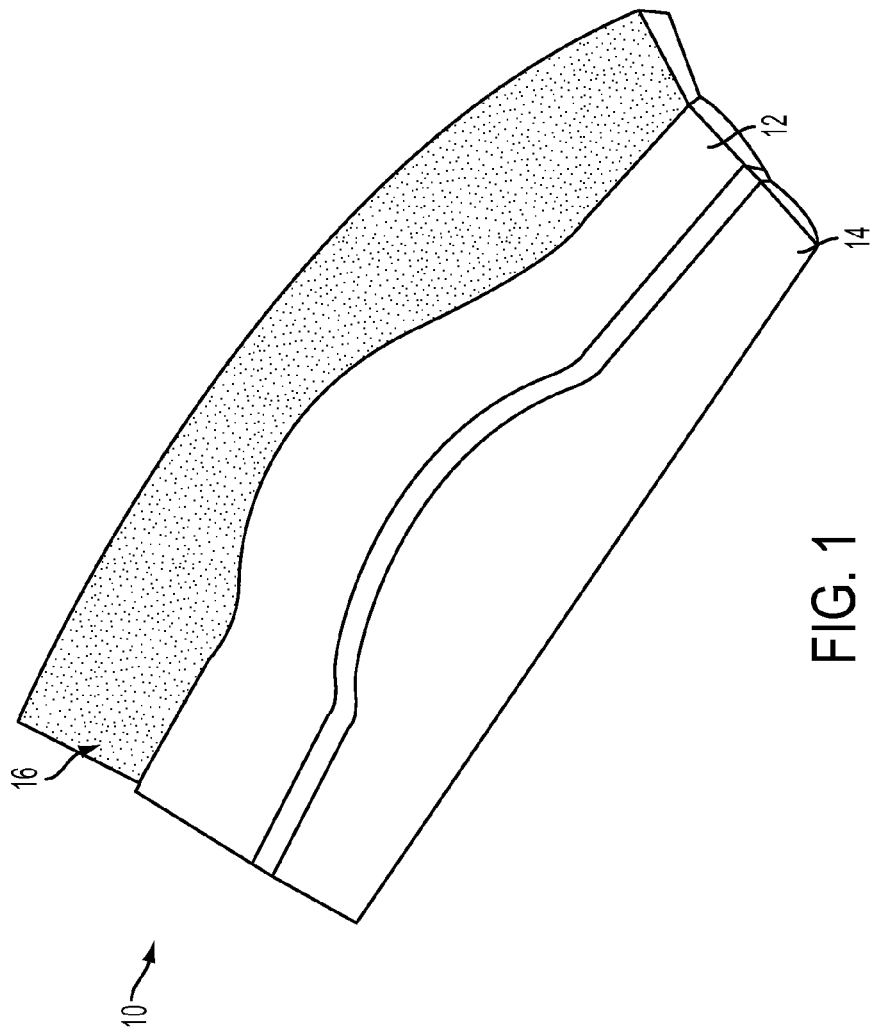

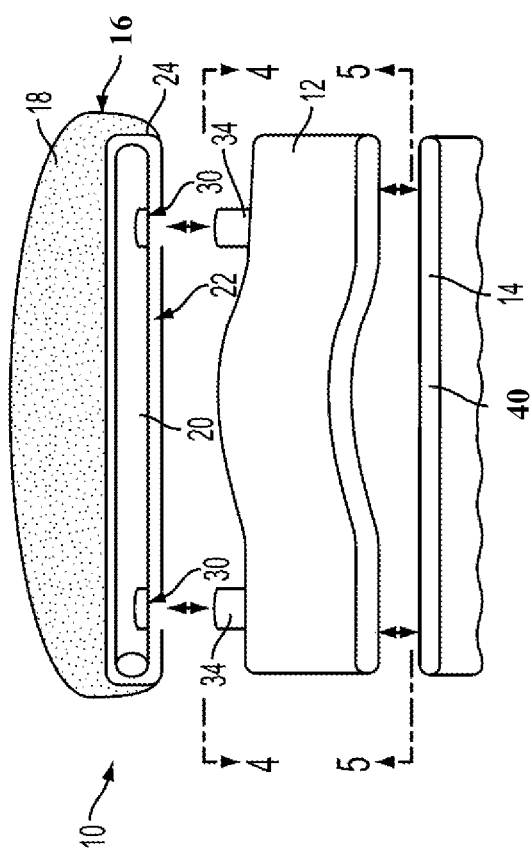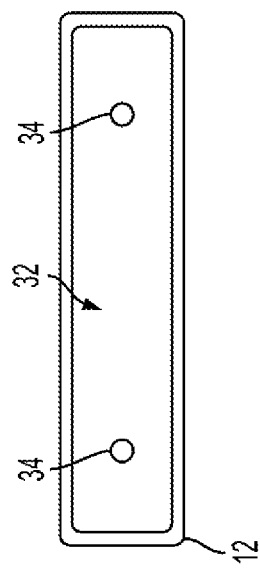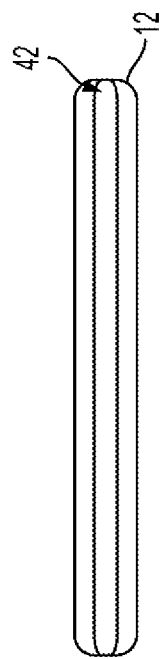

MULTI-PURPOSE CLEANING TOOL

PRIORITY CLAIM

The present application claims priority to U.S. Provisional Patent Application Ser. No. 61/552,711, filed Oct. 28, 2011, the entirety of which is hereby incorporated by reference.

BACKGROUND OF THE INVENTION

The present invention relates to cleaning tools, and more particularly to cleaning tools having at least two different cleaning implements in a single device.

Certain types of cleaning tools, such as squeegees and microfiber or chamois cloths, are typically used when drying an automobile after washing. A squeegee is useful for pushing larger quantities of water off a car's surfaces, while a microfiber cloth or chamois is useful to absorb any residual water, absorb water that sits within seams between body panels, and provide a polish to the car's surfaces. Because the cloths will absorb the water and any dirt particles that might remain on a car's surface will become entrapped within the cloth's fabric, frequent washing of the cloths is required.

It is a principal object and advantage of the present invention to provide a combination drying tool that includes both a squeegee and a cloth in a single tool.

It is another object and advantage of the present invention to provide a combination drying tool that provides a removable cloth cleaning tool.

It is a further object and advantage of the present invention to provide a combination drying tool that permits a squeegee blade to be replaced.

Other objects and advantages of the present invention will in part be obvious and in part appear hereinafter.

SUMMARY OF THE INVENTION

In accordance with the foregoing objects and advantages, the present invention provides a multi-purpose cleaning tool comprising an elongated body member, a squeegee interconnected to the body member along one edge thereof, and a microfiber cloth assembly that is interconnected to the body member along an opposite edge thereof. The microfiber cloth assembly comprises a microfiber bonnet that is open along one edge thereof and a rigid, elongated rod that is positioned within the microfiber bonnet. The edge of the body to which the microfiber bonnet assembly interconnects includes at least one and preferably two laterally spaced apart posts extending outwardly therefrom. The rigid elongated rod positioned within the microfiber bonnet includes bored openings that correspond in shape and position to the posts extending outwardly from the body. The microfiber bonnet assembly is interconnected to the body member by engagement of the at least one post extending from the body with the at least one bored opening formed in the elongated rod. The opposite edge of the body includes an elongated slot formed therein. The edge of the squeegee is sized to frictionally engage the elongated slot in order to securely interconnect the squeegee to the body member. Thus, the multi-purpose tool comprises a body member to which a squeegee and a microfiber bonnet assembly may be removably interconnected, thereby permitting washing and replacement of the cleaning implements.

With respect to the microfiber bonnet assembly, in its preferred form the rod and microfiber bonnet are of approximately equal lengths, which also correspond in approximate length to that of the body member. The microfiber bonnet includes an elastic gathering formed about its open end which can be effectively open and closed via traditional hook and loop fasteners provided on opposite interior surfaces, and is further equipped with an elastic loop stitched to its interior region. The rod is preferably positioned within the bonnet and secured by way of the elastic loop to provide rigidity to the microfiber bonnet and prevent inadvertent slippage of the rod when the microfiber bonnet is being utilized to dry a car's surface.

With respect to the squeegee, it is interconnected to the opposing edge of the body member by way of an interference fit between the squeegee's edge and a slot formed in the body's edge. In addition, the working edge of the squeegee has at least one slit formed therein (at about the midpoint along the length of the edge) to permit the blade to more easily flex and contour to the car's surface.

BRIEF DESCRIPTION OF THE DRAWINGS

The present invention will be more fully understood and appreciated by reading the following Detailed Description in conjunction with the accompanying drawings in which:

FIG. 1 is a perspective view of the present invention.

FIG. 2 is an exploded perspective view of the microfiber bonnet assembly.

FIG. 3 is an exploded view of the present invention.

FIG. 4 is a top plan view of the body member taken along line 4-4 of FIG. 3

FIG. 5 is a bottom plan view of the body member taken along line 5-5 of FIG. 3.

DETAILED DESCRIPTION

Referring now to the drawings, wherein like reference numerals refer to like parts throughout, there is seen in FIG. 1 a multi-purpose cleaning tool, designated generally by reference numeral 10, comprising an elongated body member 12, a squeegee 14 attached along one edge of the body member, and a microfiber bonnet assembly 16 attached along the opposing edge of the body member. Squeegee 14 and microfiber bonnet assembly 16 are, as will be explained in greater detail hereinafter, each releasably connected to elongated body member 12, thereby permitting replacement of worn squeegee blades and laundering and/or replacement of microfiber bonnet assembly 16.

With reference to FIG. 2, microfiber bonnet assembly 16 comprises a microfiber bonnet 18 and a rigid, elongated rod 20 that is removably positioned within bonnet 18. Bonnet 18 includes a microfiber exterior and an open bottom end 22 defined by an elastic gathering 24. Hook and loop fastening strips 26 are adhered to opposing interior surfaces of the gathering 24 to permit opening and closing of the bonnet 18. Of course, other types of fasteners, such as snaps, buttons, adhesives, and the like could also be employed in place of the hook and loop strips 26.

Elongated rigid rod 20 is of a length approximately equal to the length of bonnet 18 (and body 12) and is adapted for positioning within bonnet 18 where it can be held securely in place by way of an elastic band 28 anchored to the interior of bonnet 18. Rod 20 can be removed from bonnet 18 when cleaning or laundering bonnet 18. Rod 20 further comprises a pair of laterally spaced apart bored openings 30 that will permit it to securely connect to body member 12 in a manner described hereinafter. It should be understood that any number of bored openings 30, including a single one, could be employed for purposes of interconnecting bonnet assembly 16 to body member 12.

Referring to FIGS. 3 and 4, the upper edge of body member 12 includes a recessed area 32 from which a pair of posts 34 outwardly extends. Posts 34 are sized, shaped and positioned to correspond with bored openings 30 formed in rod 20. In interconnecting bonnet assembly 16 to body 12, posts 34 are securely/frictionally engaged with bored openings 30 to provide the interconnection. The bottom portions of bonnet assembly 16 are contained within the recessed area 32 formed in the body member's upper edge. It should be understood that the interconnecting means achieved by posts 34 and bored openings 30 could be equally well served by reversing the openings and posts (i.e., providing an opening in body member 12 and a post on rod 20), or by other conventional means, such as magnets, snaps, grommets, and other like connectors.

With reference to FIGS. 3 and 5, squeegee 14 comprises a transversely extending slit 40 formed at about its midpoint along its length that permits the squeegee 14 to flex and more easily contour to a car's surface. Additionally, squeegee 14 includes a thin upper edge that frictionally engages a slit 42 formed in the lower edge of body member 12 and extending essentially the entire length thereof, thereby securely interconnecting squeegee 14 to body 12.

What is claimed is:

1. A multi-purpose cleaning tool, comprising:
   a. an elongated body having a first elongated edge and an opposite second elongated edge, the second elongated edge having at least one first connecting member;
   b. a squeegee interconnected to said first elongated edge;
   c. an elongated cloth assembly having at least one second connecting member adapted to engage said at least one first connecting member of said second elongated edge and further comprising:
      i. an elongated cloth member having at least a partial opening formed along one edge thereof;
      ii. an elongated rod positioned within said cloth member, said elongated rod comprising said at least one second connecting member that corresponds with said elongated body's at least one first connecting member, wherein said at least one second connecting member is adapted to securely engage said elongated body's at least one first connecting member to interconnect said elongated rod to said second elongated edge of said elongated body; and
      iii. a retaining member positioned in its interior and that is adapted to retain said elongated rod in position within said elongated cloth member.

2. The multi-purpose cleaning tool of claim 1, wherein said at least one second connecting member each comprise a bored opening.

3. The multi-purpose cleaning tool of claim 1, wherein said elongated cloth member comprises fasteners positioned adjacent said opening.

4. The multi-purpose cleaning tool of claim 1, wherein said second elongated edge of said elongated body is defined by a recess formed in said body.

5. The multi-purpose cleaning tool of claim 4, wherein said at least one first connecting member each comprises a post extending outwardly from said body.

6. The multi-purpose cleaning tool of claim 4, wherein a portion of said elongated cloth assembly is positioned within said recess.

7. A cloth cleaning assembly for use in combination with a hand-held cleaning tool, comprising:
   a. an elongated cloth body having an opening formed along one edge thereof and comprising a retaining member positioned within said cloth body;
   b. an elongated rod positioned within said cloth body; and
   c. wherein said retaining member comprises an elastic band stitched to said cloth body and adapted to retain said elongated rod within said cloth body.

8. The cloth cleaning assembly of claim 7, wherein said elongated cloth body comprises fastening means positioned adjacent said opening.

9. The cloth cleaning assembly of claim 8, wherein said fastening means comprises strips of hook and loop material connected to said cloth body.

10. The cloth cleaning assembly of claim 7, wherein said rod comprises means for connecting to the cleaning tool.

11. The cloth cleaning assembly of claim 10, wherein said means for connecting to the cleaning tool comprises at least one bored opening formed in said elongated rod.

* * * * *